US008988558B2

(12) United States Patent
Chong et al.

(10) Patent No.: US 8,988,558 B2
(45) Date of Patent: Mar. 24, 2015

(54) IMAGE OVERLAY IN A MOBILE DEVICE (75) Inventors: Sheaufoong Chong, Los Gatos, CA (US); Xiaodong Luo, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 195 days.

(21) Appl. No.: 13/094,646

(22) Filed: Apr. 26, 2011

(65) Prior Publication Data

US 2012/0274808 A1    Nov. 1, 2012

(51) Int. Cl.
H04N 5/262 (2006.01)
H04N 7/14 (2006.01)
H04N 5/232 (2006.01)
H04M 1/725 (2006.01)

(52) U.S. Cl.
CPC ........... *H04N 7/147* (2013.01); *H04M 1/72555* (2013.01); *H04M 2250/12* (2013.01); *H04M 2250/22* (2013.01); *H04M 2250/52* (2013.01); *H04N 5/23293* (2013.01); *H04N 2007/145* (2013.01)
USPC ...................................... 348/239; 348/211.3

(58) Field of Classification Search
USPC ......................................................... 348/239
See application file for complete search history.

(56) References Cited

U.S. PATENT DOCUMENTS

| 7,843,487 B2 * | 11/2010 | Tojima ............................ 348/36 |
| 7,991,285 B2 | 8/2011 | Tan |
| 2003/0117501 A1 | 6/2003 | Shirakawa |
| 2005/0046740 A1 * | 3/2005 | Davis ........................... 348/373 |
| 2006/0017832 A1 * | 1/2006 | Kemppinen ............. 348/333.11 |
| 2007/0057866 A1 * | 3/2007 | Lee et al. ........................ 345/1.1 |
| 2007/0132835 A1 | 6/2007 | Kang |
| 2007/0147827 A1 * | 6/2007 | Sheynman et al. ........... 396/325 |
| 2008/0036864 A1 * | 2/2008 | McCubbrey et al. ......... 348/159 |
| 2008/0309774 A1 * | 12/2008 | Beng Goh et al. ......... 348/218.1 |
| 2010/0053212 A1 * | 3/2010 | Kang et al. ..................... 345/629 |
| 2011/0119405 A1 * | 5/2011 | Parr et al. .......................... 710/4 |
| 2011/0187811 A1 * | 8/2011 | Kim et al. .................. 348/14.01 |
| 2011/0242413 A1 * | 10/2011 | Azzopardi ................... 348/512 |

FOREIGN PATENT DOCUMENTS

TW            201029442 A1    8/2010

OTHER PUBLICATIONS

Chinese Application No. 201110266327.X—First Office Action and Search Report, with English Translation, mailed May 5, 2014 (18 pages).
TW Patent Application No. 100123940—First Taiwanese Office Action, with Search Report and English Translation, issued Aug. 19, 2014 (19 pages).
Chinese Patent Application No. 201110266327.X—Second Office Action, with English Translation, mailed Oct. 20, 2014 (13 pages).

* cited by examiner

*Primary Examiner* — Sinh Tran
*Assistant Examiner* — Shahbaz Nazrul
(74) *Attorney, Agent, or Firm* — Blakely Sokoloff Taylor & Zafman LLP (57) ABSTRACT

Image overlay in a mobile device is described. In one embodiment an imaging system of a mobile communications device includes a first camera having a control interface to a controller and a data interface to the controller, a second camera having a data interface to the first camera, and a processor to combine an image from the second camera received through the second camera data interface with an image from the first camera and to send the combined image to the controller through the data interface.

18 Claims, 7 Drawing Sheets

IMAGE OVERLAY IN A MOBILE DEVICE

TECHNICAL FIELD

The present invention relates to the field of image capture and presentation in mobile devices and, in particular, to combining images from two different cameras on a single device.

BACKGROUND INFORMATION

Many mobile devices are equipped with both a front camera with a view of the user and a rear camera with a view of the background or what lies in front of the user. The front camera is typically used for video telephone calls and portraits of the user and friends, while the rear camera is typically used more as a conventional still and video camera. In some devices, it is possible to stream video from the rear camera to another user through a cellular, Wi-Fi, or Bluetooth radio connection. However, it is not possible or feasible to use both cameras of the mobile device simultaneously. Such devices currently include cellular telephones, portable media players, and tablet computers, however, as device classifications change and develop, the particular names, types, and features of mobile devices and of cameras may change as well.

In current mobile devices, a user may view an image or video recorded by one of the cameras on the device's display. This view may be combined with camera controls, communication controls, and an image or video from another device. For example, when used as a still camera, the device's display functions as a viewfinder and control interface. The user sees first sees the camera's view of the scene before it and capture controls for exposure, focusing, color balance, etc. After the image is captured, the user typically sees the captured image with viewing and editing controls on the same screen.

When used as a video telephone, the display shows a video of the remote party and, in some cases, a video also of the user superimposed on the screen. However, these devices do not permit the display to show captured images from both cameras on the same display at the same time. They also do not permit images captured from the two cameras at the same time to be transmitted to another mobile device. This limits the usefulness of the two cameras on the mobile device.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for image overlay in a mobile device are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment, a user is able to record video of the background from the rear camera and also record a simultaneous narration from the front camera using a single mobile device. The narration can be combined as a live overlay of the user over the background image or video. This function can be provided using two separate image or video processors or a single controller can take in the two video streams and merge them in software or a special hardware image processing or graphics processing module. Alternatively, this function can be provided by a master image sensor used to control a slave image sensor.

In the present description, cameras are described that are capable of producing still images and video images. However, the invention is not so limited. These images may be synchronized with audio by the cameras or in another process. The still images may be raw or compressed and the video may be raw or compressed and analog or digital. For consistency in the present description, "image" is used to refer to an image that is a single image for still photography or to one of a sequence of images in a video photography sequence. "Video" herein is used to refer to a timed sequence of images that may or may not be accompanied by audio. Similarly, a "still image" also may or may not be accompanied by audio.

Figure 1:
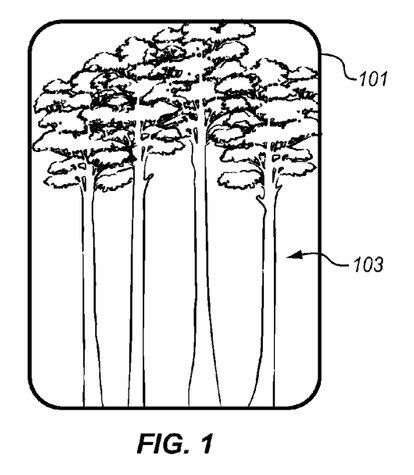
FIG. 1 is a diagram of a mobile device display showing a background video, in accordance with an embodiment of the invention.

An example of a mobile device display screen 101 is depicted in FIG. 1. In this example, the user has traveled to a stand of Coastal Redwood trees 103, the tallest trees in the world, on the Pacific Coast of North America and, using the rear facing camera has captured an image or a video of the trees in front of him. These trees stand in front of the rear facing or primary camera of the mobile device. The user can capture a single image or a video of the trees and record the video or send it to others or to remote storage using a radio built in to the mobile device or a radio of a networked device.

Figure 2:
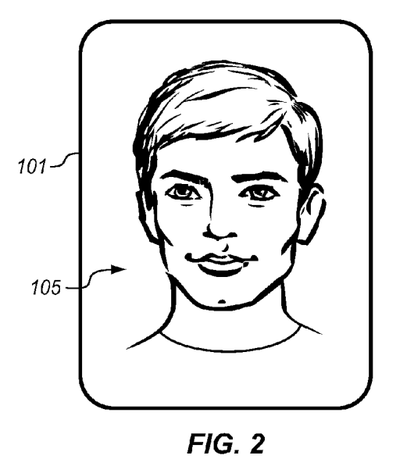
FIG. 2 is a diagram of a mobile device display showing a foreground video of a user, in accordance with an embodiment of the invention.

FIG. 2 is an example of the same mobile device display screen showing the user 105 as captured by the front camera. Using the front camera, the user can capture a video of himself describing the trees, the forest, the sense of the place, or any other matters.

Figure 3:
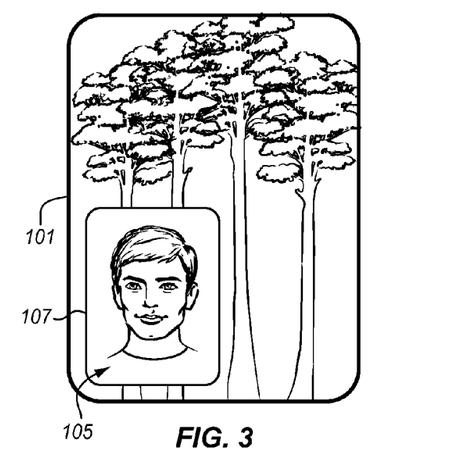
FIG. 3 is a diagram of a mobile device display showing the user video of FIG. 2 overlaid on the background video of FIG. 3, in accordance with an embodiment of the invention.

In FIG. 3, the mobile display is configured to combine the image of the trees from the rear camera with the image of the user from the front camera. The image of the user is overlaid onto the image of the trees. This provides an inset 107 of the user together with the larger background image. As in the other examples, either or both images may be a still image or a video image.

Figure 4:
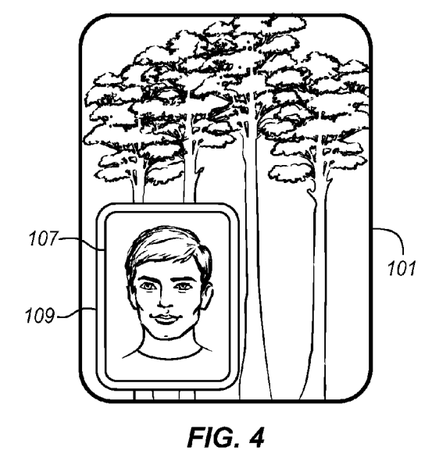
FIG. 4 is a diagram of the mobile device display of FIG. 3 with a border around the user video, in accordance with an embodiment of the invention.

In FIG. 4, the inset 107 is enhanced with a border or frame 109 that makes the inset easier to distinguish from the primary image. The size, color, opacity, pattern, and other features of the border may be configured by the user or may be determined automatically, in whole or in part, based on the primary image.

Figure 5:
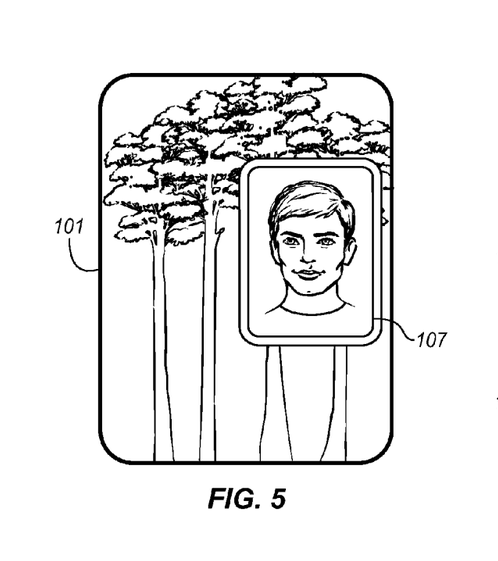
FIG. 5 is a diagram of the mobile device display of FIG. 4 in which the user video is presented in a different location, in accordance with an embodiment of the invention

The user may be provided with additional options. As shown in FIG. 5, the position of the inset may be moved to different places on the primary image. This can allow the user to expose different parts of the primary image that may otherwise have been obscured by the inset.

Figure 6:
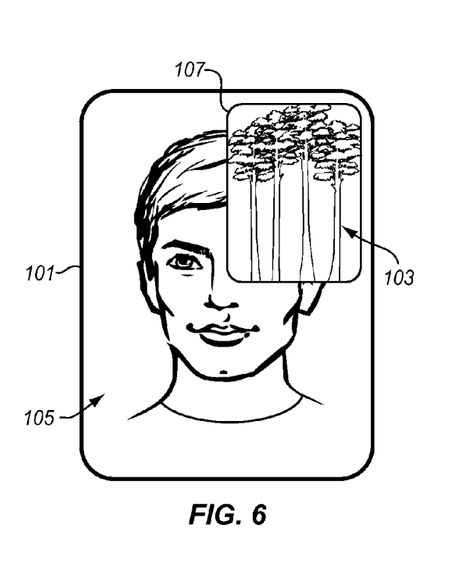
FIG. 6 is a diagram of a mobile device display showing the background video of FIG. 3, with a border, overlaid on the user video of FIG. 2, in accordance with an embodiment of the invention.

In FIG. 6, the images are reversed so that the image of the trees 103 now fills the inset, while the image of the user 105 is the primary image. This and many other manipulations of the two images may be performed by the user to control the captures from the two cameras and how they are displayed. For example, in addition to changing the position of the inset, the relative size of the inset might be changed.

Figure 7:
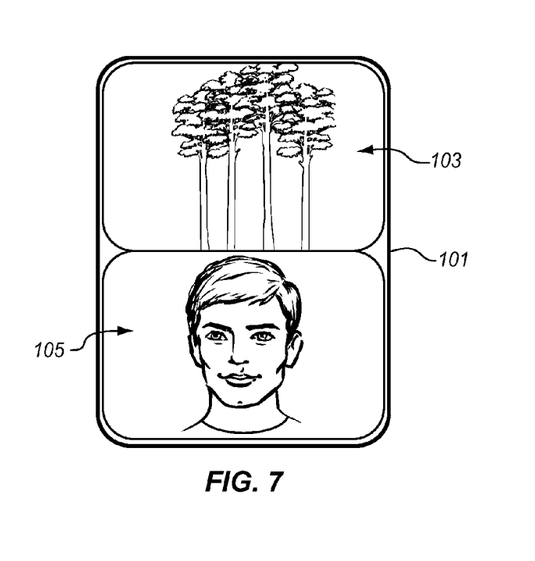
FIG. 7 is a diagram of a mobile device display showing the background video of FIG. 3, in one area of the display, and the user video of FIG. 2 in another area of the display, in accordance with an embodiment of the invention.

In the example of FIG. 7, the two images are positioned beside each other, rather than overlaid. In this example, the forest 103 is positioned in the upper half of the display, above the user 105 which is positioned in the lower half of the display. The relative sizes and positions of the two images may be changed to suit a particular user's preference. While a horizontal position is shown, the images can also be placed vertically side-by-side. While the two images are shown as equal in size, the relative sizes may be varied to suit a particular user preference or for any other reason.

The different views of FIGS. 1-7 may be controlled using a keyboard, a pointing device, or using screen gestures on a touch screen. Some mobile devices feature a game pad or a cursor movement switch or pad and select button. In such a case, the inset may be moved, for example, by moving a cursor over the inset, selecting it and then moving a joystick to move the image to a new position. Alternatively, the image might be moved to four or more predefined positions on the primary image. Other mobile devices feature a touch screen, in which case the inset may be touched and then dragged to a new position. A variety of different commands, gestures, and controls may be used to achieve the effects of FIGS. 1-6. In addition, the mobile device may also offer a variety of image capture controls, such as focus, zoom, lighting, exposure control, etc.

The mobile device may also offer options to substitute one of the images for another image, for example an image stored in a memory of the device or an image received from another mobile device. In this way, the user can switch between narrating the background to narrating a previous background or video to receiving a video of another background or discussion from another connected user. In one example, the inset is used for video chat or video telephony with another user, while the primary image can be switched between the rear camera's view, the other user's rear camera view and other images or video that is considered to be interesting or relevant to the video chat session.

In the examples of FIGS. 1-7, the display is described in the context of taking a mobile telephone to a forest park. However, the description is not limited to a particular location nor to a particular device. Many different types of mobile devices offer or may be adapted to offer multiple cameras with different views. In addition to cellular telephones, notebook computers, tablet computers, personal media players, portable gaming consoles, and personal digital assistants may all be offered with multiple cameras with different views. The present invention may also be applied to multiple cameras on personal navigation devices, fitness trackers, and even vehicles from camera-equipped robots, telepresence vehicles, automobiles, and trucks. Some automobiles are currently equipped with rear view, front view, side view cameras, and interior cameras. A single display inside the vehicle allows the user to see the camera views. Some automobiles also allow the driver to send the camera images to a cellular telephone outside the vehicle.

Figure 8:
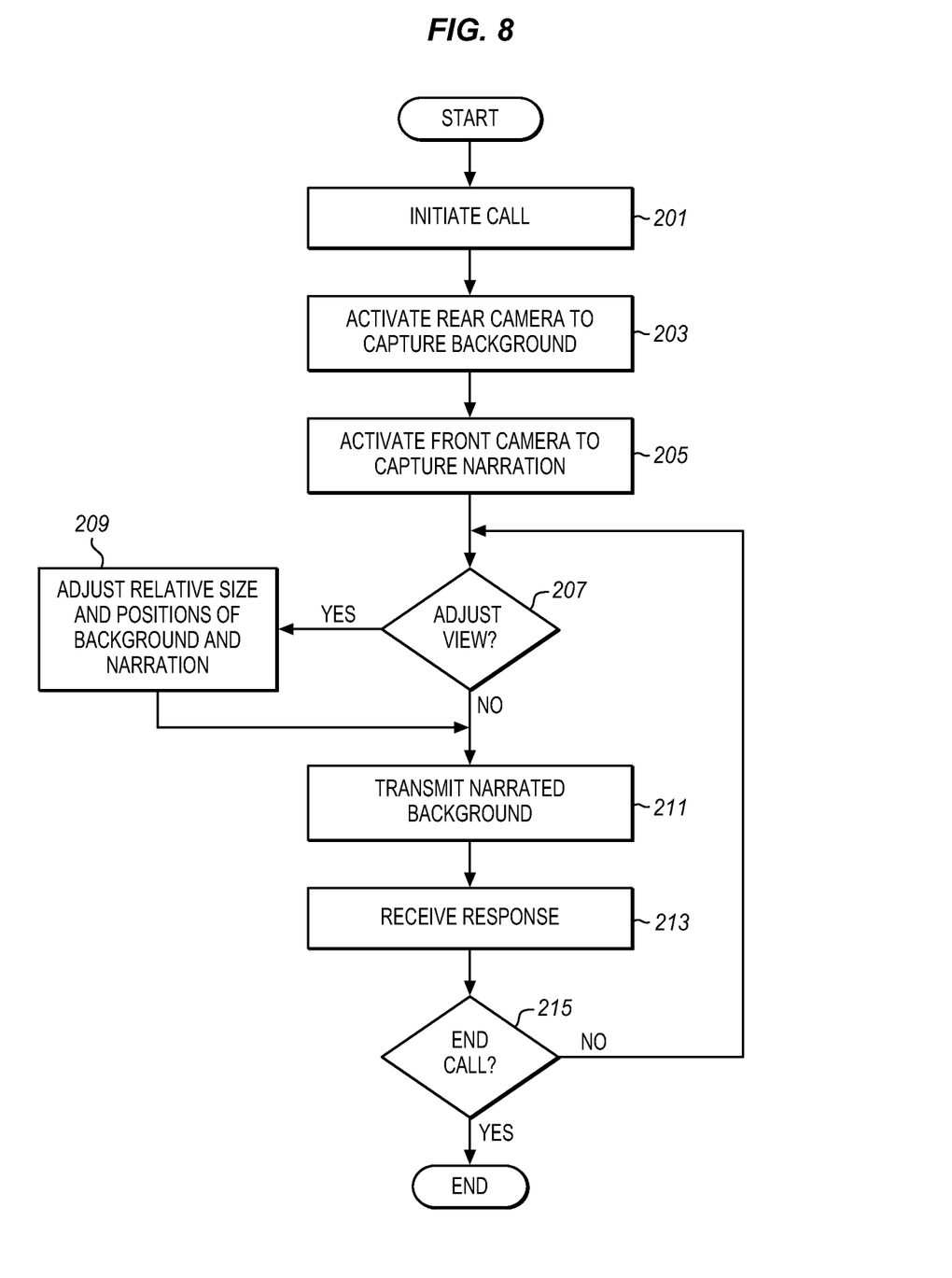
FIG. 8 is a process flow diagram illustrating establishing a call that communicates narrated video, in accordance with an embodiment of the invention.

Any one or more of the views of FIGS. 1-7 can be sent by the mobile device to local memory, to remote memory, or to another user. FIG. 8 shows a sample, process flow for using a mobile device using the illustrated displays. The process starts and at block 201, the user initiates a call. The call can be through a cellular, wide area, local area, or personal network connection. The call may be initiated using a telephone application or a separate video call application. For other devices, the call may not be a proper telephone call, but a network session through a personal or wide area network, for example. The call may also be a session with a remote server from which data may be relayed to one or more other users.

At 203, the user activates the rear camera to capture a background view and at 205, the user activates the front camera to capture the user's narration. These operations may be performed before or after the call is initiated. While a front and back camera or typical choices for a cellular telephone, other devices may offer different cameras with different views. Automobiles, for example may offer rear view, front view, side view and interior views.

At 207, the user determines whether the view as shown in the display should be adjusted. If so then at block 209 the view is adjusted. This can be done by changing view, focus point, zoom level, exposure, etc. or the actual image. In addition, the position and resolution or the images may be changed.

After adjustment, or if no adjustment is desired, then at block 211, the two views from the two cameras are transmitted over the network. At 213, the user receives a response to the transmission. The exchange of messages, images, video, and audio may continue throughout the course of the call or session. As long as the call continues at 215, the user can adjust the view, transmit and receive. When the call is ended then the process comes to an end.

While this process is described in the context of a user operating a mobile device, the operations may also be performed by the mobile device automatically. Differing levels of automation may be provided. In one example, the mobile device evaluates the camera images and the received images and changes the relative size, position, and selection of images based on the evaluation. The session can be ended when both sides stop generating new content for a selected period of time. Similarly the start of the call or session can be automated to varying degrees based on programmed preferences, image recognition, etc.

As another alternative, the user may perform the operations of FIG. 8 without initializing a call. The operations may be in response to a received call from another party or without any call. The narrated video may be produced for local storage or for remote storage. The narrated video may be uploaded to a blog site or other publication destination independent of any call. It may also be saved locally for private exhibition later on the mobile device or an attached viewer.

The adjustment of the view of block 209 can include all of the types of changes mentioned in the context of FIGS. 1-7. It can also include showing images received from the called party. The received images may be of the caller or of the background of the caller and can be overlaid onto the front or rear camera view of the mobile device or shown exclusive of any camera view of the mobile device. The user can adjust specifically which images are shown at any time during the call. There may also be more than one called party. The call or session may have three or more parties, in which case, the user may select which, if any, of the received images from the other parties may be shown on the display. In one example, the user transmits local images to other parties to the call but displays only received images.

The various approaches and views shown above allow video to be sent to other mobile or fixed devices with and without a narration or accompanying chat or conversation. The accompanying narration may be sent as additional video or as audio only. This allows the mobile device user to not only narrate a current event but also to discuss nearby fixed objects such as a landscape, a building, equipment, or documents.

The operations of FIG. 8 are described as being performed by a user operating a mobile device. However, the operations can also be performed without the user. Any one or more or all of the operations can be performed by a mobile device controller running appropriate software or firmware to operate the cameras and transmit combined images to another device.

Figure 9:
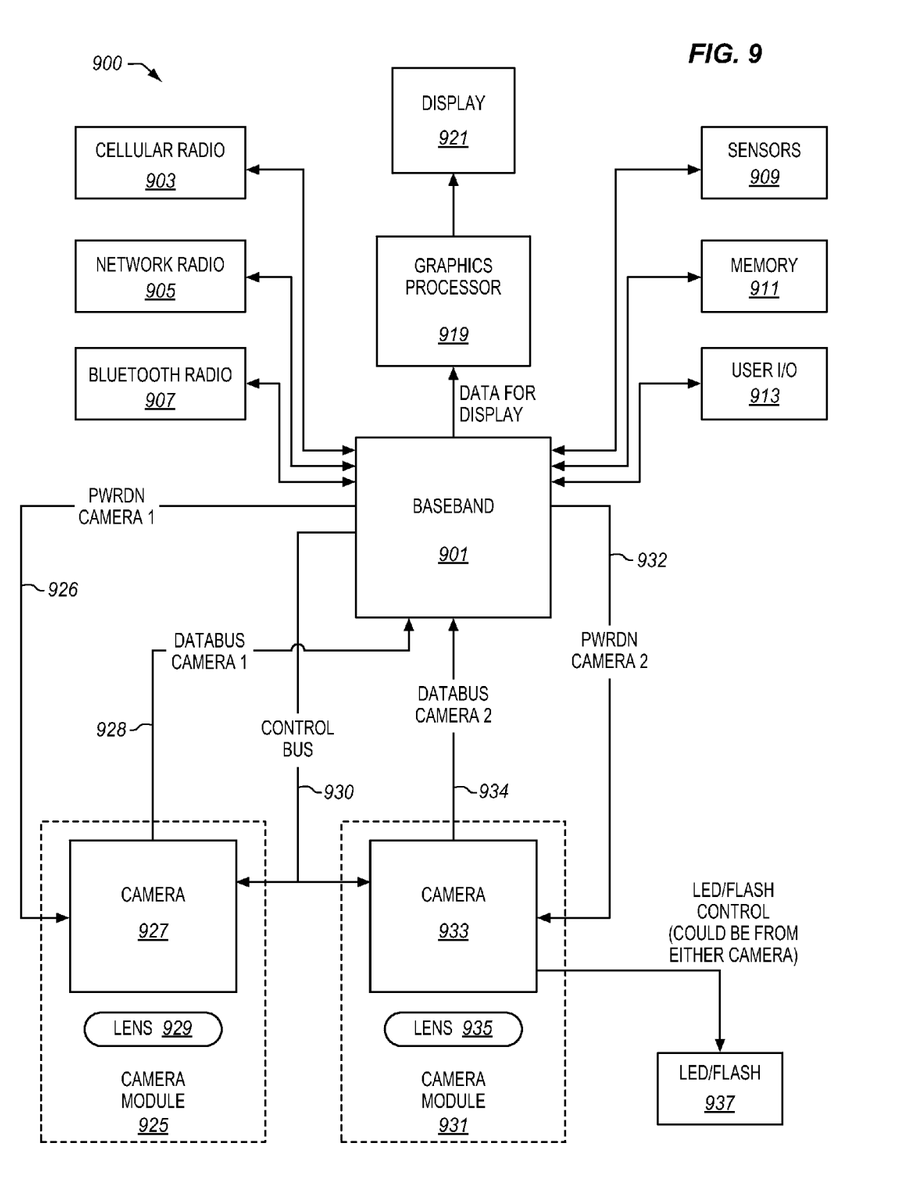
FIG. 9 is a functional block diagram illustrating a mobile device with two cameras independently connected to the baseband, in accordance with an embodiment of the invention.

FIG. 9 is block diagram of a mobile device hardware platform suitable for use with embodiments of the present invention. The mobile device 900 has a baseband processor 901 which may be in the form of a central processing unit, microcontroller, baseband or other general purpose controller. The baseband is coupled to one or more radios for communication with base stations, access points, and other users as well as peripheral devices for data exchange. In the illustrated examples, the radios include a cellular radio 903, a network radio 905, and a Bluetooth radio 907. Other radios, for example, a positioning system receiver, may be used instead of or in addition to those shown. The radios are coupled to antennas (not shown) and other devices as may be appropriate for the particular communications interface.

The mobile device baseband is also coupled to sensors 909, such as accelerometers, gyroscopes, compasses, orientation sensors, magnetometers, proximity sensors, ambient light sensors, etc. Memory 911 is coupled to the controller to provide programming instructions, configuration data, and mass storage. The memory may include internal memory and a port, slot, or socket for additional removable memory. In addition, for some embodiments there may be connectors for external memory to provide media files or other large files. The controller is also coupled to user I/O (input/output) 913 such as a keyboard, pointing device, touch screen sensor, microphone, speaker, and other devices. The user I/O may also include ports for additional peripherals, such as a USB (Universal Serial Bus) port or other peripheral device interface.

The mobile device further includes two camera modules as discussed above. The first camera module 925 is a front camera with a power control line 926 connection to the controller, a data bus 928 connection to the controller, and a control bus 930 connection to the controller. Through these connections, the controller can operate the camera module, turn it on and off and receive captured image and video from its sensor. The second camera module 933 represents a rear camera or any other camera and also includes a power control line 932, a data bus 934 connection and the control bus 930 connection to the controller. Through these connections both cameras can be independently controlled and operated by the controller and the images from both cameras can be combined in any way desired to achieve the displays of FIGS. 1-7.

In this example, the power control is separate from the control bus, any one or more of the power, control and data connections may be combined, depending on the particular implementation. In addition, the control bus 930 is shown as shared by the two cameras. In one example, this is an I2C (Inter-Integrated Circuit) bus to which several other components of the mobile device are also connected. Any other control bus may be used and different devices may share some or all of the bus, depending on the particular implementation.

As shown in FIG. 9, the controller is also coupled to a graphics processor 919 which receives graphics data captured by the cameras from the controller. The graphics processor renders the data as desired and passes the rendered graphics to a display 921. The display may then render the displays 101 of FIGS. 1-7, among others. The display may be an internal display built into the mobile device or an external display coupled through a cable, a dock, or a wireless interface.

Each camera module includes a sensor (not shown) and a lens 929, 935 to focus images onto the sensor. The camera modules may have a pixel array and an image signal processor to control and process signals received from the pixel array. The camera modules may also include other components (not shown) such as a focus control, zoom control, aperture control, shutter, exposure sensor and other devices. The camera module may further include external interfaces (not shown) for flash and capture synchronization and other features. The second camera module 931 is shown as including a connection to an LED/Flash 937. Typically such a flash will be mounted on the mobile device near the lens and can use any type of light source. However, any type of light source may be used depending on the design features of the flash or lighting system. Either or both camera modules may feature a flash or a connection to a flash. Alternatively, the two cameras may use the same flash or lighting system.

Using the system 900 of FIG. 9, a view from either or both cameras may be received by the controller and presented by the graphics processor on the display. The user interface may be used to control the operation of the cameras and how the views are presented. In addition, the views from either or both cameras can be transmitted through any one or more of the connected radios. Similarly, any one or more of the radios may receive images from other devices, whether mobile or fixed, and provide those to the baseband controller. These images may be combined with other images or control features and be presented on the display.

Figure 10:
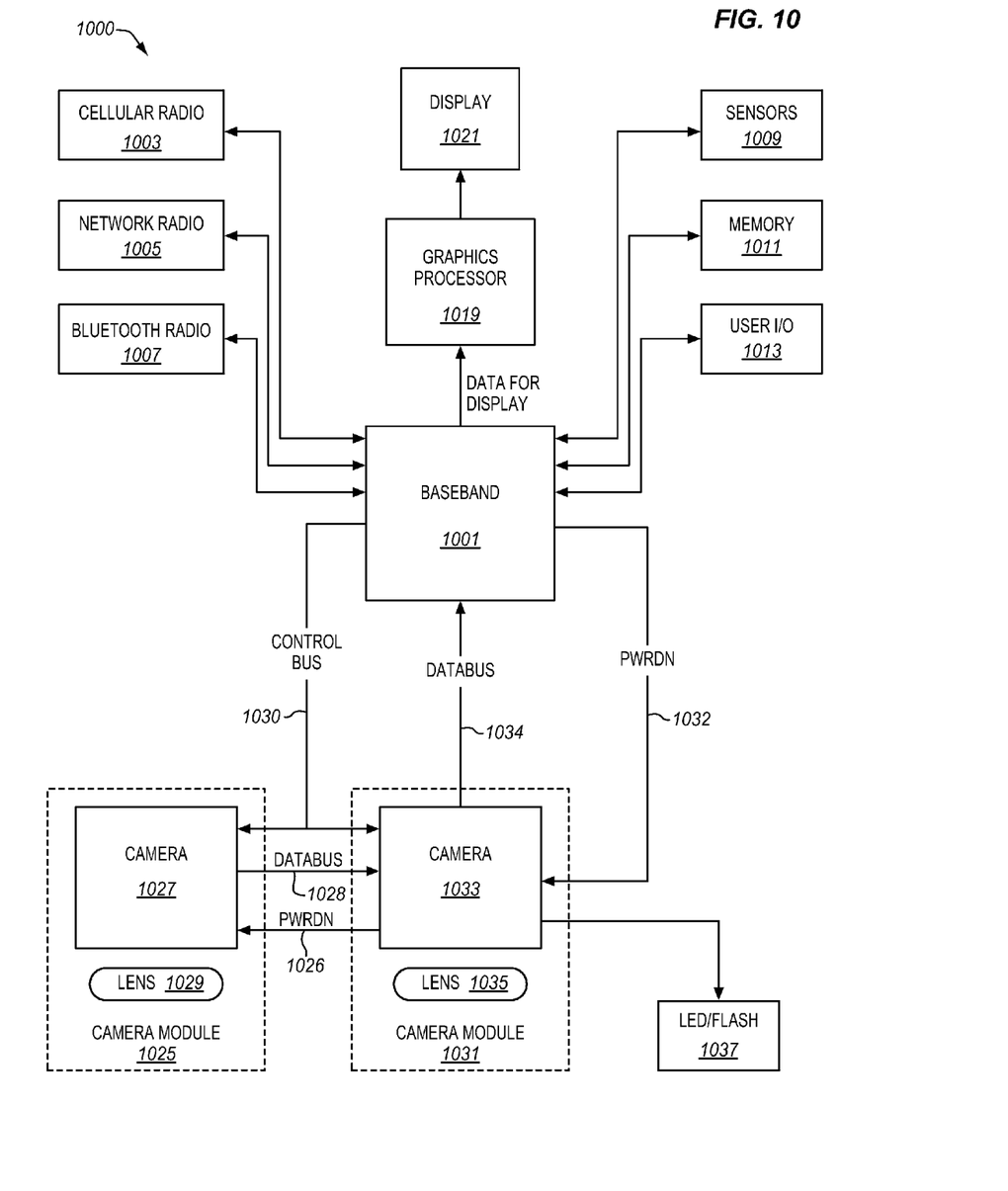
FIG. 10 is a functional block diagram illustrating a mobile device with two cameras connected to each other and then connected together to the baseband, in accordance with an embodiment of the invention.

FIG. 10 is block diagram of an alternative configuration of a mobile device hardware platform 1000 suitable for use with embodiments of the present invention. As in FIG. 9, the mobile device 1000 has a baseband processor 1001 coupled to one or more radios such as a cellular radio 1003, a network radio 1005, and a Bluetooth radio 1007. Other radios, including a GPS (global positioning system) radio may also be used. The mobile device baseband is also coupled to sensors 1009, memory 1011, and user I/O 1013. The controller 1001 is also coupled to a graphics processor 1019 which receives graphics data captured by the cameras from the controller. The graphics processor renders the data as desired and passes the rendered graphics to a display 1021. The camera modules include a sensor (not shown) and a lens 1029, 1035 to focus images onto the sensor as well as a flash 1037 for at least the larger rear camera.

As in the example of FIG. 9, the mobile device 1000 further includes two camera modules, for example a front camera 1025 and a rear camera 1031. The exact position of the cameras and their respective fields of view may be adapted to suit different applications. As in the example of FIG. 9, the second camera module 1033 has a power control line 1032, a data bus 1034 connection and a control bus 1030 connection to the controller. In this example, the controller has only one camera connection interface so this single connection is shared by the two camera modules.

In some mobile devices, both cameras are connected directly to the single interface. The connection is switched between the two cameras, depending upon which camera is active. For this reason, only one camera can be used at a time. This makes the presentations of FIGS. 3-7 impossible.

In the example of FIG. 10, however, the front camera module 1025 is not connected to the controller but is connected to the rear camera module 1031. In other words, in the present example, the smaller front camera is coupled directly to the larger rear camera and the rear camera is coupled to the controller. The primary camera will act as the control hub for the secondary camera. The baseband will only need to connect and communicate with the primary camera and send commands through I2C to enable and disable the secondary and the primary camera. All picture data from the front camera passes through the rear camera before being passed on to the controller.

In a typical cellular telephone, the rear camera has a larger sensor as measured in surface area and in pixels. Accordingly, the processing power of the camera module necessary to support the rear camera sensor is greater for the rear camera than for the front camera. Therefore, the hardware architecture is simplified by connecting the smaller and less powerful front camera to the larger and more powerful rear camera. However, the connections can be reversed so that the rear camera is connected to the front camera and the front camera is connected to the controller. This may be done to better suit a different hardware configuration of the cameras or for different types of devices for which the front camera is larger.

In the illustrated example, the front camera has a power control line 1026 connected to the rear camera, and a data bus 1028 connected to the rear camera. Accordingly, all of the image sensor data from the front camera passes through the rear camera image processor. The control bus 1030 from the controller is shown as connected to both the front and rear cameras independently. This allows the controller to control the operation of both cameras independently of each other.

Figure 11:
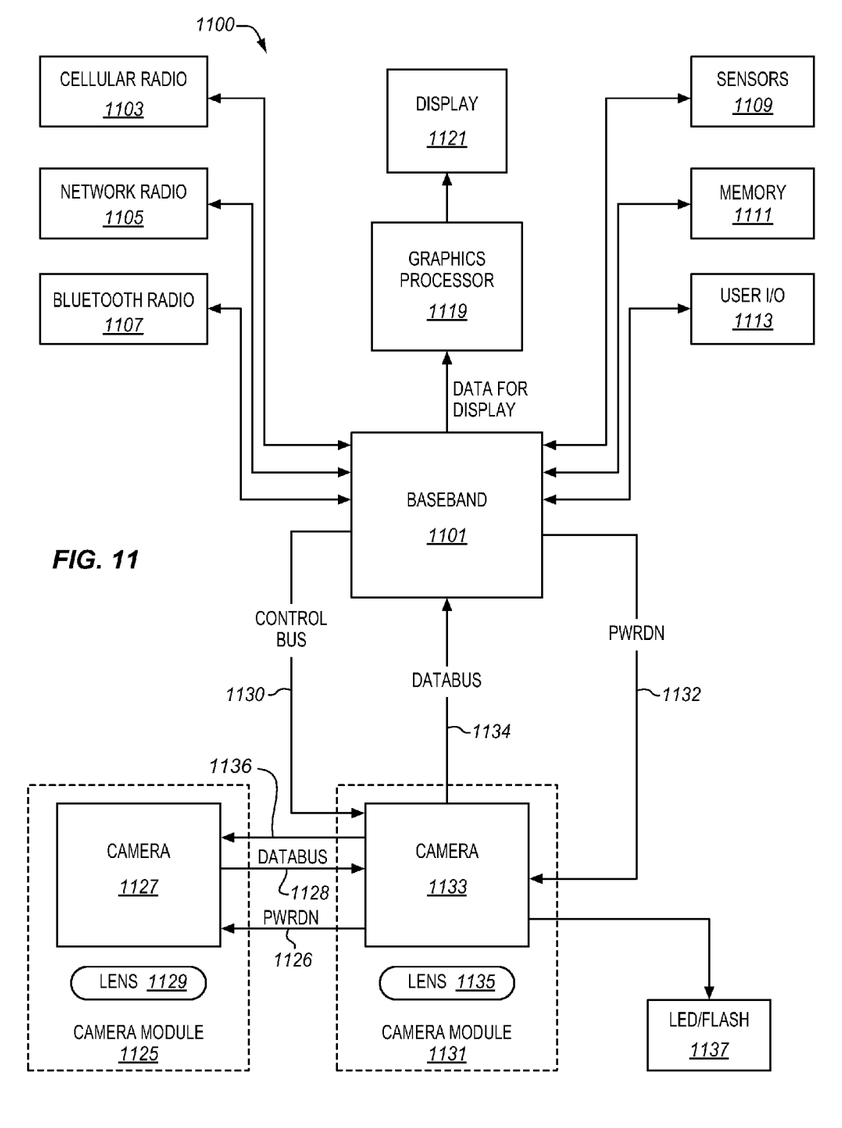
FIG. 11 is a functional block diagram illustrating a mobile device with two cameras connected to each other and then connected together to the baseband, in accordance with another embodiment of the invention.

If the controller uses a shared bus, such as I2C, a single connection to a master node of the controller allows the controller to control all of the peripherals as slaves on the bus. One, two, three, or a hundred cameras can all be controlled on the same bus by a master node in the baseband 1001. Accordingly, in the illustrated example, the front camera 1025 is coupled directly to the controller through the shared bus. If a different bus is used or a different control protocol is desired, then the front camera control line may instead be coupled to the rear camera as shown in FIG. 11. For I2C, this would require that the rear camera operate as both a slave node to the controller and a master node to the front camera. However, for other control buses and protocols, there may be other requirements. Through these connections the controller can operate both camera modules, turn them on and off and receive captured images and videos from their sensors.

The rear camera can overlay the images captured by the front camera onto the images captured by the rear camera. Because the front camera data capture is received by the rear camera, the rear camera can combine the captures of both cameras and combine them as desired in any of the ways suggested in FIGS. 2-7. A single combined image or video can then be sent by the rear camera to the controller. If only one camera is active, then its image or video can be sent to the controller without change as suggested in FIGS. 1 and 2.

As described above, the rear camera is able to control the secondary or front camera through I2C to turn it on. It is also able to decode the SPI (Serial Peripheral Interface) input into the primary camera and convert the decoded serial data to parallel data and send it though a parallel data bus such as MIPI (Mobile Industry Processor Interface) for the baseband. The primary camera is also able to multiplex the secondary camera video data out if the secondary camera is selected to be active by the Baseband. While doing so, the primary camera can enter a low power mode while muxing the data output from the secondary camera.

FIG. 11 is block diagram of another alternative configuration of a mobile device hardware platform suitable for use with embodiments of the present invention. In FIG. 11, the front camera is completely isolated from the baseband and is connected only to the rear or primary camera. The primary camera completely controls the secondary camera and its connection to the rest of the mobile device.

As in FIG. 9, the mobile device 1100 has a baseband processor 1101 coupled to one or more radios 1103, 1105, 1107. The mobile device baseband is also coupled to sensors 1109, memory 1111, and user I/O 1113. The controller 1101 sends graphics to display 1121 through a coupled graphics processor 1119. In this and the other figures, the graphics processor may be incorporated into the baseband or the display, depending on the particular requirements for the system. The camera modules 1125, 1131 each include a camera 1127, 1131 and a lens 1129, 1135 to focus images onto the sensor as well as an optional flash 1137 for at least the larger rear camera.

As in the example of FIG. 9, the second camera module 1133 has a power control line 1132, a data bus 1134 connection and a control bus 1130 connection to the controller. In this example, the controller has only one camera connection interface so this single connection is shared by the two camera modules.

In the example of FIG. 11, however, the front camera module 1125 is not connected to the controller but is connected to the rear camera module 1131. In other words, in the present example, the smaller front camera is coupled directly to the larger rear camera and the rear camera is coupled to the controller. The primary camera will act as the control hub for the secondary camera. The baseband will only need to connect and communicate with the primary camera and send commands through I2C to the primary camera to enable and disable the secondary and the primary camera. All picture data from the front camera passes through the rear camera before being passed on to the controller.

In the illustrated example, the front camera has a power control line 1126, a data bus 1128, and a control line 1136 all connected to the rear camera. Accordingly, all image sensor data, power, and control from the front camera passes through the rear camera image processor. While in FIG. 10, the control bus 1030 from the controller is shown as connected to both the front and rear cameras using a single bus. In the example of FIG. 11, the basesband control line is not connected to the secondary camera. The secondary camera is therefore dependent upon the primary camera.

If the controller uses a shared bus, such as I2C, the controller can control one or both cameras using a single master node. Therefore, the examples of FIGS. 10 and 11 require the same number of connection interfaces on the baseband controller. However, by connecting control signals only to the primary camera, the baseband controller can treat both cameras as a single device. This may simplify the firmware or software implementation of the baseband. The primary camera may then be used to interpret commands and control the cameras to execute the received control instructions.

The rear camera receives the image data from the front camera and combines that data with any rear camera data as desired to accomplish the effect requested by the baseband controller. These effects can include the simultaneous use of both cameras to show insets as in FIGS. 2-7.

Figure 12:
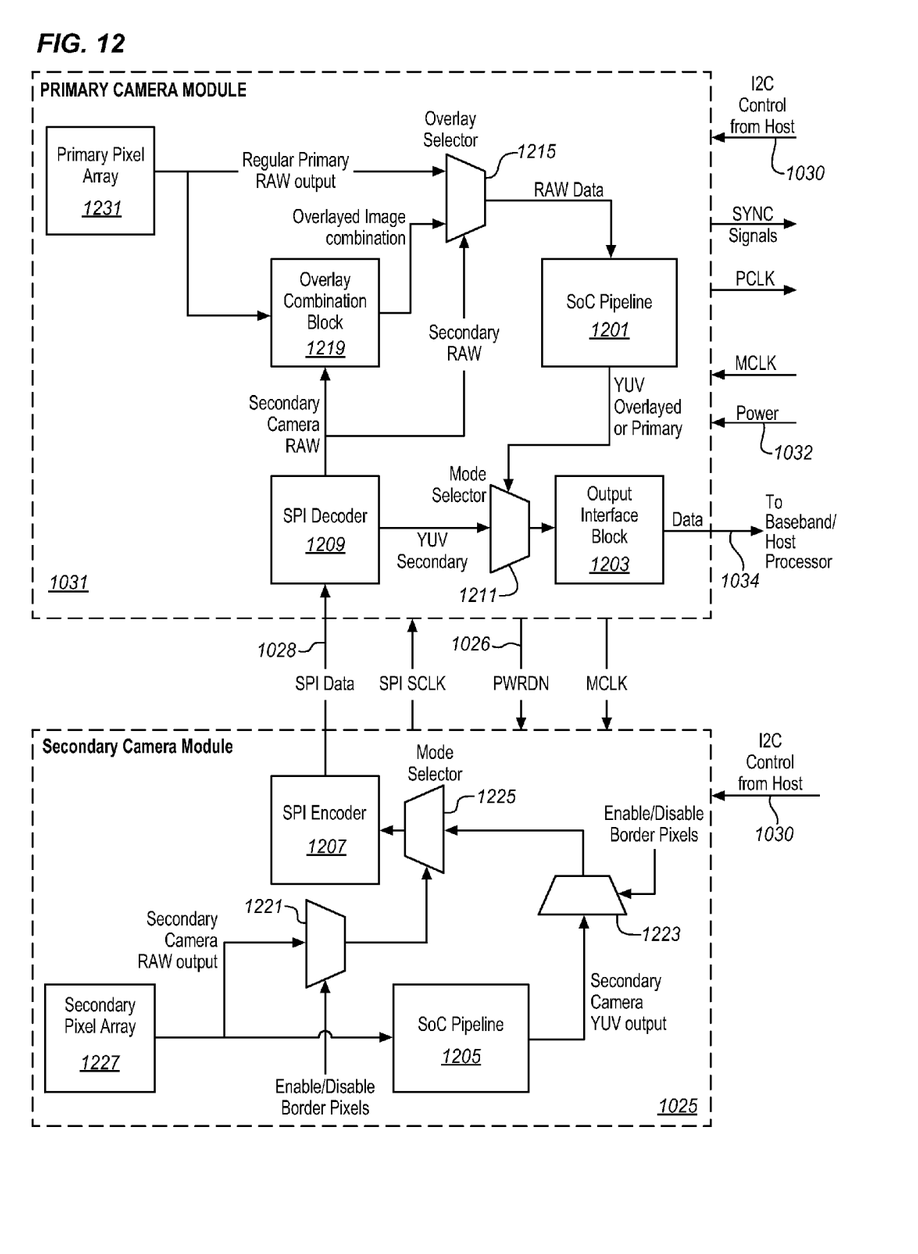
FIG. 12 is a functional block diagram illustrating the two camera modules of FIG. 10, in accordance with an embodiment of the invention.

FIG. 12 shows a more detailed view of the two camera modules 1025, 1031 of FIG. 10. Each camera module includes a respective pixel array 1227, 1231 and a variety of other components which may be provided as discrete elements as shown or as part of respective image signal processors. Many of the connections for control, data and power are not shown in detail so as not to obscure the features that are described below. In addition, one or both of the camera modules may include additional components that are also not shown in order not to obscure the described features.

The primary camera module is controlled by a connection to the baseband controller 1001 through the control bus 1030, in one example, an I2C bus. The control bus 1030 may be connected to both modules, as shown, or to only the primary camera module as in FIG. 11. The primary camera module in that case controls the secondary module.

The secondary or front camera module sends the image data captured by its pixel array 1227 to the primary or rear camera module through a data connection 1028 between the two. In one example, this connection is an SPI (Serial Peripheral Interconnect) bus connection. The primary camera module combines or selects images from the two cameras, depending upon the commands from the controller through the control signals and forwards the selected or combined image to the controller through a second data bus 1034 which may also be an SPI bus. The camera module also has power connections 1026, 1032 as mentioned above and a variety of clock and synchronization connections as shown.

The SPI interface has an encoder 1207 and a decoder 1209 and reduces the number of pins required to transfer even fairly high bit rate video from the front camera to the primary camera. However, any of a variety of other interfaces may be used instead of SPI.

Considering the primary camera, image data captured by its sensor or pixel array 1231 can be sent as a RAW output or in any other format through a SOC (System on a Chip) Pipeline 1201 to be converted into a YUV (luminance, chrominance color space) format and then sent to an output interface block to be sent to the controller 1001 as YUV image or video data over a data bus 1203.

Similarly, the secondary camera 1027 output can be sent to a SOC pipeline 1205 on the secondary camera module for conversion to a YUV format and then sent to the primary camera output block 1203 for transmission over the same bus 1034. In the illustrated example, to send the YUV image data between the primary and secondary camera an SPI encoder 1207 or interface is used at the secondary camera module to send data over the SPI bus to an SPI decoder 1209 on the primary camera module. The SPI decoder then receives the YUV data from the bus and transmits it to the output interface block.

As indicated, the primary camera module has a multiplexer 1211 to receive the primary camera YUV signal from the SOC pipeline and the secondary camera YUV signal from the SPI decoder and then to select the appropriate signal to provide to the output interface block 1203. As mentioned above, the choice of which signal to provide to the baseband controller can be made based on a command on the control bus 1030 from the controller or on some other basis. Alternatively, the raw camera data can be sent to the primary camera and processed by the SOC pipeline in the primary camera. The SOC pipeline in the secondary camera can then be removed to reduce cost.

The SOC pipelines, the SPI data bus and the output interface block of the primary camera's image signal processor allow the mobile device or the user to select between, for example, the display of FIG. 1 and the display of FIG. 2. In the described example, the camera pixel arrays provide RAW data, that is unprocessed data, from the sensor to an image signal processor that includes an SOC pipeline which converts the image data into a YUV signal. Alternatively, the pixel arrays may perform some in-situ processing of the recorded image and provide any of a variety of other formats to the SOC pipeline. The SOC pipeline may pass the RAW image data to the controller in some or all modes. For example, in a quality still photography mode, the user may prefer to record only the RAW data for manipulation on the mobile device or for post-processing on another image processing machine.

The signal output from the SOC pipeline may be provided in any of a variety of different image formats promulgated, for example, by JPEG (Joint Photographic Experts Group), MPEG (Motion Picture Experts Group), VCEG (Video Coding Experts Group), or any other open or closed format setting body. The YUV signal is commonly used for video but is also be used for still images, and any desired variation of YUV or other still or video image format may be used.

In addition to the capability of selecting images from one or the other of the cameras and supplying only the selected video to the controller, the camera modules are capable of providing the other features described above in the context of FIGS. 1-7. The primary camera module 1031, using for example the image signal processor components shown in FIG. 12, is able to overlay the images to create a combined image output 1034 to the controller. In the example of FIG. 12, the overlay function is provided by multiplexers that are controlled by select lines. The select lines are controlled by the host controller using the control bus 1030. In one example, the host controller addresses a register that is coupled to a particular multiplexer. The host controller writes a bit that selects the operational mode of the multiplexer. In this way the controller can control whether a particular multiplexer takes one input, another input or combines the two inputs in one or more different ways. Any of the multiplexers described herein may be controlled in this way.

An overlay multiplexer 1215 of the primary camera module allows the system to select the image for the primary camera, the secondary camera, or an overlay combination block 1219. The multiplexer has three inputs, one for each of the three choices. The primary camera input is coupled directly to the primary camera 1033 to capture the output directly from the camera. This may be a raw or other format output, depending on the particular embodiment. The secondary camera input is coupled directly to the SPI decoder 1209 which receives the image data from the secondary camera. This is indicated as being a raw input, however, other formats may be provided instead or as a choice for the user.

The overlay combination block 1219 combines the raw input from the secondary camera. The size of the secondary camera overlay onto the primary camera image can be made adjustable by the user. The overlay combination block can perform the scaling or the secondary camera can be provided with a scaling capability so that a properly sized image can be transmitted to the primary camera for the overlay.

The overlay combination block 1219 is coupled to receive the same first two inputs as the overlay multiplexer, the primary camera and the secondary camera direct input as a raw or other type of image file. The overlay combination block takes these two image files and combines them based on commands received from the controller or based on an automated or fixed routine. In one example, as shown in FIG. 3, the overlay combination block takes the pixels of an image from the secondary camera and uses them to replace a portion of the pixels of an image from the primary camera. In a current typical high quality mobile device, the front camera might have a 1.3MP (megapixel) resolution and the rear camera an 8MP resolution. Accordingly, without any scaling, a front camera inset will cover about one-sixth of the rear camera view. The particular position of the inset can be determined by the user, automatically selected by the overlay combination block, or fixed by default.

In another embodiment, the overlay block receives the front camera image and scales it to a desired size, increasing or reducing its pixel count. The scaling may be performed within the overlay combination block, at the secondary camera or at any other desired location, and may be performed using any of a variety of known techniques. The amount of scaling can be determined by the user or in any other way. The scaled image is then overlaid on to the rear camera image. Scaling may be particularly useful when reversing the background and the inset as shown in FIG. 6. Here the pixel count or size of the front camera can be increased to fill the screen, while the pixel count or size of the rear camera can be reduced to fill only a portion or the screen before the two images are combined. Similarly for the side-by-side or over and under views suggested in context of the example of FIG. 7, for the two images to appear to be the same size either or both of the images are scaled to equal each other.

The output of the overlay combination block is a combined image that has pixels or data from both images combined in any one of a variety of different ways. In the present description, the images are described as being superimposed one over the other because this is how they appear to the user. In FIGS. 3 and 4, for example, it appears as if the image of the user is placed over the image of the trees. The overlay block can, in fact, superimpose the images in the sense of layering one image over the other. This can even be done with varying levels of transparency or opacity so that the background image, in this case the trees may be rendered as still somewhat visible through the inset image. Alternatively, the overlay combination block may replace pixels of one image with pixels of the other images, as discussed above. In this case, the replaced pixels are lost and not sent to the controller over the data bus 1034. Similarly for a partially transparent inset, the actual pixels of the background and the inset may be replaced with pixels that are a mixture of both and the original pixels are not sent to the controller.

As shown in FIG. 12, the output of the overlay selector multiplexer 1215 is coupled to the SOC pipeline and from there is conveyed to the output interface block 1203 in the same way that the primary camera image alone would be, as described above.

The secondary camera module includes border pixel multiplexers 1221, 1223 that may be provided only in the secondary camera module as shown, in the primary camera module or both. The border pixels allow the border effect 109 of FIG. 4 to be added to the inset. For the example of FIG. 5, in which the inset is the primary camera image and the inset also includes a border, a similar set of multiplexers may be provided in the primary camera module. Alternatively, borders may be added in the overlay combination block or in some other subsystem of the camera modules.

The first border pixel multiplexer 1221 has one input that is the immediate camera output as a raw or other image format. The other input is a control line to enable or disable the border pixels. In this case the multiplexer has set of border pixel positions and values stored in a local or internal memory. As an example, for a VGA (640×480) front camera, the stored border pixels may include a black (or any other color) value for pixels at 1:1, 1:2, 1;3,, to 1:640. The multiplexer replaces these values with the values from the camera to create the first portion of a thin black border across the top of the image. A final border may have 5, or 10, rows or more and 5, or 10 columns or more of the border color on all four sides of the image. The actual thickness of the border may be provided as a user setting or as a set of default values from which the user may select.

A second border multiplexer 1223 receives the YUV or other format signal from the SOC pipeline. This allows a different technique to be used by this multiplexer to accommodate the different characteristics of the images from the SOC pipeline. As with the first border multiplexer, the second border multiplexer has the image input as its sole input, in this case from the SOC pipeline, and a control signal input to enable or disable the border pixels. The two border multiplexers are both coupled to a final output selection multiplexer 1225. This multiplexer determines whether to provide the raw camera output, with or without a border, or the YUV camera output, with or without a border, to the SPI encoder 1207 which serves as an output block for the secondary camera module.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An imaging system of a mobile communications device comprising:
   a first camera configured to capture first image data;
   a second camera configured to capture second image data, wherein the first camera is coupled to receive the second image data via a first data interface coupled between the first camera and the second camera, and wherein the second camera is a slave to the first camera; and
   a processor comprising an overlay combination block coupled to receive the first image data and the second image data from the first camera, wherein the overlay combination block is configured to form a combined image using the first image data and the second image data received from the first camera, the processor being integrated with the first camera, wherein the first camera is a slave to the processor, and wherein the processor is coupled to send the combined image to a controller through a second data interface that is different from the first data interface,
   wherein the first camera includes a decoder coupled to receive the second image data from the second camera and decompress and decode the second image data into raw image data.

2. The system of claim 1, further comprising a radio coupled to the controller to send the combined image from the controller to a remote device.

3. The system of claim 1, further comprising a multiplexer to apply a border to a second image comprised of the second image data from the second camera before the second image data is combined with the first image data from the first camera.

4. A method comprising:
   capturing primary image data using a first camera of a mobile communications device;
   capturing secondary image data using a second camera of the mobile communications device, wherein the second camera is a slave to the first camera;
   transferring the secondary image data to the first camera;
   decompressing and decoding the secondary image data from compressed image data to raw image data with a decoder of the first camera;
   combining the primary image data and the secondary image data using an overlay combination block of a processor integrated with the first camera to create a combined image, wherein the first camera is a slave to the processor; and
   sending the combined image through a radio of the mobile communications device to a remote mobile communications device.

5. The method of claim 4, wherein combining comprises superimposing an image comprised of the primary image data over an image comprised of the secondary image data.

6. The method of claim 4, wherein combining comprises superimposing an image comprised of the secondary image data over an image comprised of the primary image data.

7. The method of claim 4, wherein the first camera is mounted on a first surface of the device and the second camera is mounted on a second surface of the device.

8. The method of claim 7, wherein the second surface is a surface opposite the first surface.

9. The method of claim 7, wherein the first camera is one of a front camera and a rear camera and the second camera is the other of a front camera and a rear camera.

10. The method of claim 4, further comprising recording audio associated with the primary image data and sending the recorded audio through the radio with the combined image.

11. The method of claim 4, further comprising configuring a location of an image comprised of the primary image data over which an image comprised of the secondary image data is superimposed.

12. The method of claim 4, further comprising configuring a border for an image comprised of the secondary image data.

13. The method of claim 4, wherein capturing the primary image data comprises capturing a primary video stream and wherein capturing the secondary image data comprises capturing a secondary video stream.

14. The method of claim 13, wherein the primary and secondary video streams are simultaneous.

15. A camera module comprising:
   a pixel array to capture first image data;
   a lens to focus an image onto the pixel array;
   a first data interface to receive second image data from a second camera module, wherein the second camera module has a lower pixel count than the camera module;
   an image signal processor coupled to receive the second image data from the second camera module and configured to combine the first image data with the second image data into a combined image;
   a second data interface to transmit the combined image to an external device, wherein the second data interface comprises a decoder to receive the second image data from the second camera module in compressed form and to decode and decompress it into raw image data;
   a first control interface to receive control signals from an external device to control how the first image data is combined with the second image data; and
   a second control interface configured as a master to control the operation of the second camera module, wherein the second control interface is independent of the first control interface.

16. The camera module of claim 15, wherein the image signal processor controls the application of a border to an image comprised of the second image data by the second camera module through the second control interface.

17. The camera module of claim 15, wherein an image comprised of the second image data is combined as an inset on an image comprised of the first image data.

18. The camera module of claim 15, wherein the image signal processor comprises a system-on-a-chip to render the combined image as a chrominance, luminance signal.

* * * * *